United States Patent
Davis et al.

(10) Patent No.: US 7,270,791 B2
(45) Date of Patent: Sep. 18, 2007

(54) ANGULAR FLOW DISTRIBUTION BOTTOM HEAD

(75) Inventors: Mark Bradley Davis, Hurricane, WV (US); Wesley James Perry, Louisville, KY (US)

(73) Assignee: Univation Technologies, LLC, Houston, TX (US)

( * ) Notice: Subject to any disclaimer, the term of this patent is extended or adjusted under 35 U.S.C. 154(b) by 395 days.

(21) Appl. No.: 10/847,561

(22) Filed: May 17, 2004

(65) Prior Publication Data

US 2005/0255009 A1    Nov. 17, 2005

(51) Int. Cl.
*B01J 8/18*  (2006.01)
(52) U.S. Cl. ............... 422/139; 422/131; 422/143; 422/145; 568/62; 568/88
(58) Field of Classification Search ........... 422/139, 422/143, 145, 195, 220, 131; 526/62, 88
See application file for complete search history.

(56) References Cited

U.S. PATENT DOCUMENTS

| | | | |
|---|---|---|---|
| 2,611,685 A | 9/1952 | Yoder | |
| 3,848,016 A | 11/1974 | Kono et al. | |
| 4,003,712 A | 1/1977 | Miller | |
| 4,135,889 A | 1/1979 | Mori | |
| 4,336,227 A | 6/1982 | Koyama et al. | |
| 4,414,100 A * | 11/1983 | Krug et al. | 208/153 |
| 4,431,856 A * | 2/1984 | Daviduk et al. | 585/469 |
| 4,469,855 A | 9/1984 | Cooper | |
| 4,518,750 A * | 5/1985 | Govoni et al. | 526/68 |
| 4,877,587 A * | 10/1989 | Rhee et al. | 422/135 |
| 4,882,400 A | 11/1989 | Dumain et al. | |
| 4,933,149 A | 6/1990 | Rhee et al. | |
| 4,994,534 A | 2/1991 | Rhee et al. | |
| 5,059,664 A | 10/1991 | Yada et al. | |
| 5,116,940 A | 5/1992 | Eisenger | |
| 5,213,768 A | 5/1993 | Maurel et al. | |
| 5,306,792 A | 4/1994 | Havas et al. | |
| 5,401,890 A | 3/1995 | Parks | |
| 5,428,118 A | 6/1995 | Painter et al. | |
| 5,453,471 A | 9/1995 | Bernier et al. | |
| 5,627,243 A | 5/1997 | Hamalainen et al. | |
| 5,688,910 A | 11/1997 | Wang | |

(Continued)

FOREIGN PATENT DOCUMENTS

EP    0 173 261 B1    9/1991

*Primary Examiner*—N. Bhat
(74) *Attorney, Agent, or Firm*—Leandro Arechederra; Kevin M. Faulkner

(57) ABSTRACT

An improved angled annular deflector for a gas-phase polymerization reactor and improved method for delivery of a stream of polymerizable fluid to a gas-phase polymerization reator. The angled annular deflector has an outer surface with a conical shape, an inner surface, and an inner cavity along a central axis, said cavity open at both ends, the inner surface having a first end and a second end, and the first end of the inner surface mated to the apex end of the outer surface: and an upper surface mated to the base end of the outer surface and to the second end of the inner surface; wherein the outer surface, the inner surface, and the upper surface form a substantially closed chamber. The angled annular deflector being adapted to associate with a cone-shaped bottom portion of a fluidized bed polymerization reactor vessel.

10 Claims, 5 Drawing Sheets

U.S. PATENT DOCUMENTS

| | | |
|---|---|---|
| 5,723,041 A | 3/1998 | Devanathan et al. |
| 5,912,309 A | 6/1999 | Lee et al. |
| 6,126,905 A * | 10/2000 | Wells .......................... 422/144 |
| 6,189,236 B1 | 2/2001 | Gaines et al. |
| 6,429,269 B1 | 8/2002 | Leaney |
| 6,441,108 B1 | 8/2002 | Haendeler et al. |
| 6,903,168 B2 * | 6/2005 | Knauer et al. ................ 526/68 |

* cited by examiner

ANGULAR FLOW DISTRIBUTION BOTTOM HEAD

TECHNICAL FIELD

The present invention relates to an angular flow distribution bottom head for use in fluidized bed polymerization reactors. More particularly, it relates to improvements in fluidized bed polymerization reactors, an angled annular deflector and the distribution of fluid introduced into said reactors.

BACKGROUND OF THE INVENTION

Fluidized bed processes for the production of polymers has been well known in the art for several years. It is believed to have first been used in an industrial scale as early as 1968.

In this process, a polymerizable fluid generally enters the reactor at the bottom. There is generally an initial area where the polymerizable fluid is uniformly mixed prior to entering the fluidized bed reaction zone where the actual polymerization reaction takes place. The reactor generally has an outlet for removal of the polymer and separation of unreacted polymerizable fluid for recycling through the reactor.

In order to maintain a fluidized bed, a circulating gas stream is fed into the reactor from below. The circulating gas stream which consists essentially of unreacted monomers and inert materials is removed again at the top of the reactor, residual particles removed, gas stream cooled and put back into the reactor. The resultant polymer is removed from the reaction zone continuously or semi-continuously and treated further.

Various patents covering fluidized bed reactors and their components are known in the art. See, for example, U.S. Pat. Nos. 2,611,685; 4,518,750; 4,933,149; 5,059,664; 5,213,768; 5,401,890; 5,627,243; 5,723,401 and 6,441,108.

These various patents have adjusted the shape of the reactor, added components to separate chambers of the reactor or have added components to affect the flow distribution of the fluidized gas stream. Even with these changes, problems exist with the flow of the gas into the reaction vessel, as well as making sure that the side of the reaction vessel keeps clean of the formed polymer and that the particles carried in the polymerizable fluid do not fall back into the gas stream and potentially plug the reactor flow. The present invention provides an improved design for an angled annular deflector, an angular flow distribution bottom head and reactor vessel to facilitate the flow of gas into the reactor bed, the removal of contaminants and polymer from the sides of the wall, and the prevention of particle fall back into the gas stream.

BRIEF SUMMARY OF THE INVENTION

One embodiment of the present invention includes an angled annular deflector for angular flow distribution in a fluidized bed polymerization reactor. The angled annular deflector has an outer surface with a conical shape and an inner cavity along a central axis, said cavity open at both ends; wherein the angled annular deflector is adapted to associate with a cone-shaped bottom portion of a fluidized bed polymerization reactor vessel and when in said association the conical shaped outer surface of the angled annular deflector is at an angle such that said outer surface is substantially parallel to an inner wall of the cone-shaped bottom portion.

In another embodiment there is a bottom head which is generally the bottom portion of a cylindrical reaction vessel, said bottom head being an inverted cone-shaped portion attached to an inlet means for continuously introducing a stream of polymerizable fluids into said reactor. It further includes an angled annular deflector having an outer surface with a conical shape and an inner cavity along a central axis, said cavity open at both ends, wherein the outer surface of said angled annular deflector is in association with and is substantially parallel to an inner wall of the cone-shaped bottom portion.

In a preferred embodiment the angled annular deflector is adapted to divide a stream of polymerizable fluid flowing through the reactor into two or more streams flowing in at least two fluid flow paths of which at least one flow path is directed upwardly between the outer surface of the conical shaped angled annular deflector and the inner wall of the cone-shaped bottom portion and at least one flow path is directed generally through the angled annular deflector upwardly along the central axis, the division of said stream being such that the velocity of fluid flowing upwardly along the inner wall of the reaction vessel is sufficient to entrain solid particles and liquid droplets and maintain the same in the fluid entrained state and to inhibit the build-up of solid particulate polymer product on the inner wall of the reaction vessel, and the velocity of fluid flowing upwardly through the angled annular deflector along a central axis is sufficient to prevent solid particulate polymer product from falling into said angled annular deflector and the combined overall velocity and direction of said fluid flowing in all flow paths being such that sufficient mixing is provided to ensure the general uniformity and distribution of polymerizable fluids entering a fluidized bed region of the reactor.

The use of the improved device of the present invention provides an improved method for gas-phase polymerization reactions by a more efficient delivery of a stream of polymerizable fluid to said reactor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

It is readily apparent to one skilled in the art that various embodiments and modifications can be made to the invention disclosed in this Application without departing from the scope and spirit of the invention.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having", "including", "containing" and "comprising" are interchangeable and one of skill in the art is cognizant that these terms are open ended terms.

In a continuous fluid bed polymerization reactor, see for example that shown in U.S. Pat. No. 4,933,149, one skilled in the art recognizes that there must be adequate flow coming from the bottom in order to facilitate the polymerization reaction. It has also been found that there also must be a distribution of flow, otherwise the polymer and/or particles may stick to the sides of the wall of the reaction vessel.

The present invention provides an improvement in splitting the gas flow in order to facilitate the reaction in the reaction bed and to maintain the sides of the reaction vessel clean. The main improvement over the prior art is the use of an angled annular deflector having a conical shape. This angled annular deflector has a cavity in the central axis such that fluid can flow through the angled annular deflector. The outer walls of the angled annular deflector are conical. The angle of the conical shape depends on the shape of the reaction vessel to be used. In the preferred embodiment, the angle of the outer conical sides is set such that the outer conical sides shall be substantially parallel to the inside wall of the reactor. In a preferred embodiment, the reactor has an inverted cone shape bottom portion in which the angled annular deflector fits into. The angled annular deflector can be attached to the internal reaction vessel by any method commonly used in the art.

Figure 1:
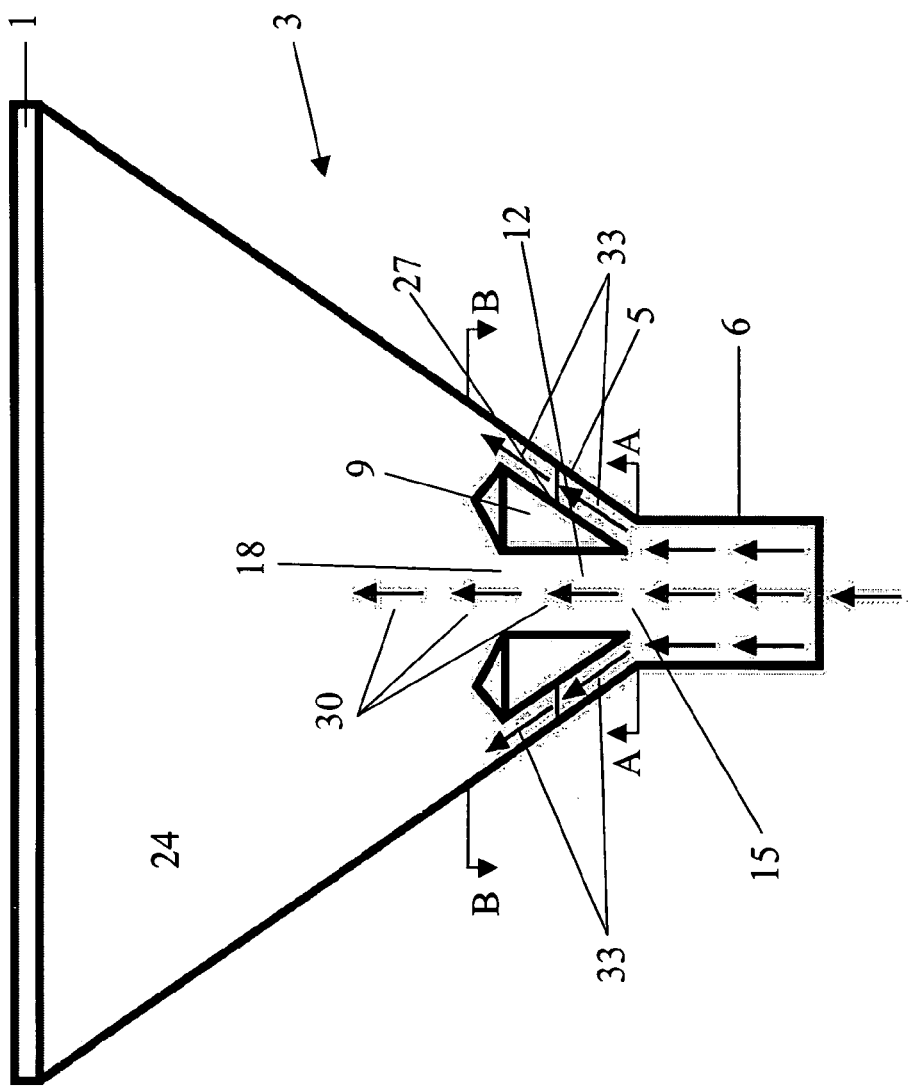
FIG. 1 shows a cut away view of the bottom head with an angular flow distribution angled annular deflector of the present invention.

Now referring to FIG. 1, where a cutaway of a bottom head (3) of a fluidized bed polymerization reactor is shown. The bottom head comprises the entire assembly of the reaction container which is below the distributor plate (1). The bottom head (3) is an inverted cone-shape. The bottom portion (5) of the bottom head (3) is attached to the inlet means (6) for the flow of gas. This inverted cone-shaped bottom portion (5) is a change from the usual hemispherical bottom design found in these types of reactors. The rest of the shape of the reactor is substantially cylindrical and is identical to that existing in the art.

Figure 2:
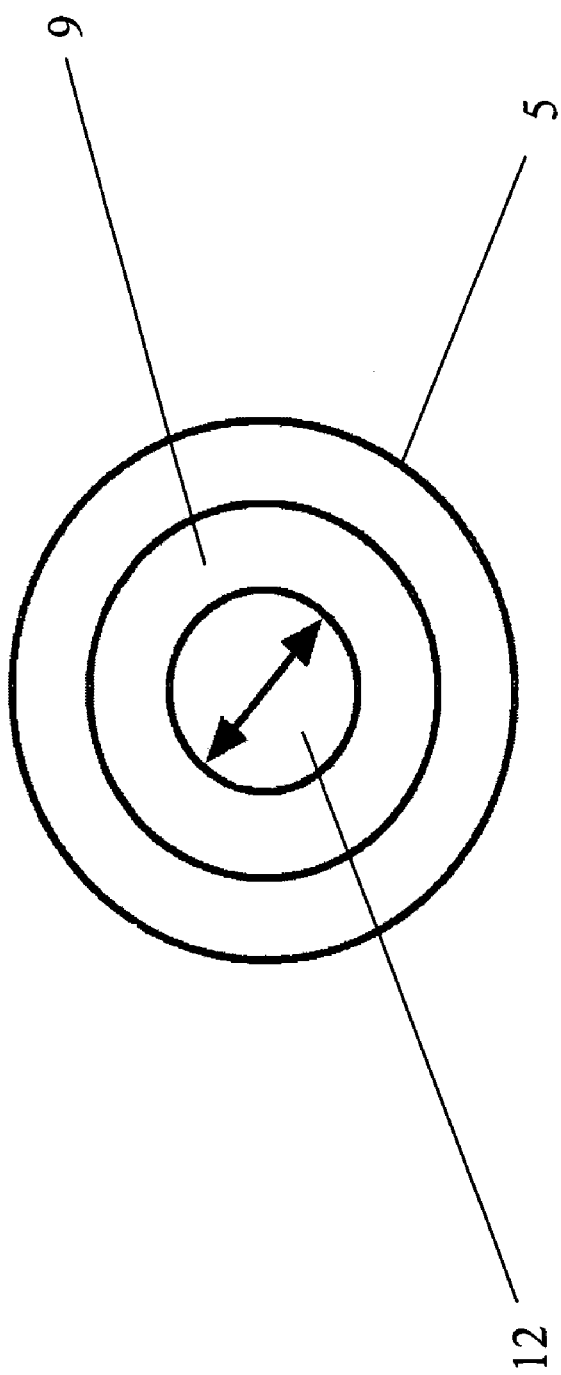
FIG. 2 shows a top view of the angled annular deflector looking along the path B-B.
Figure 3:
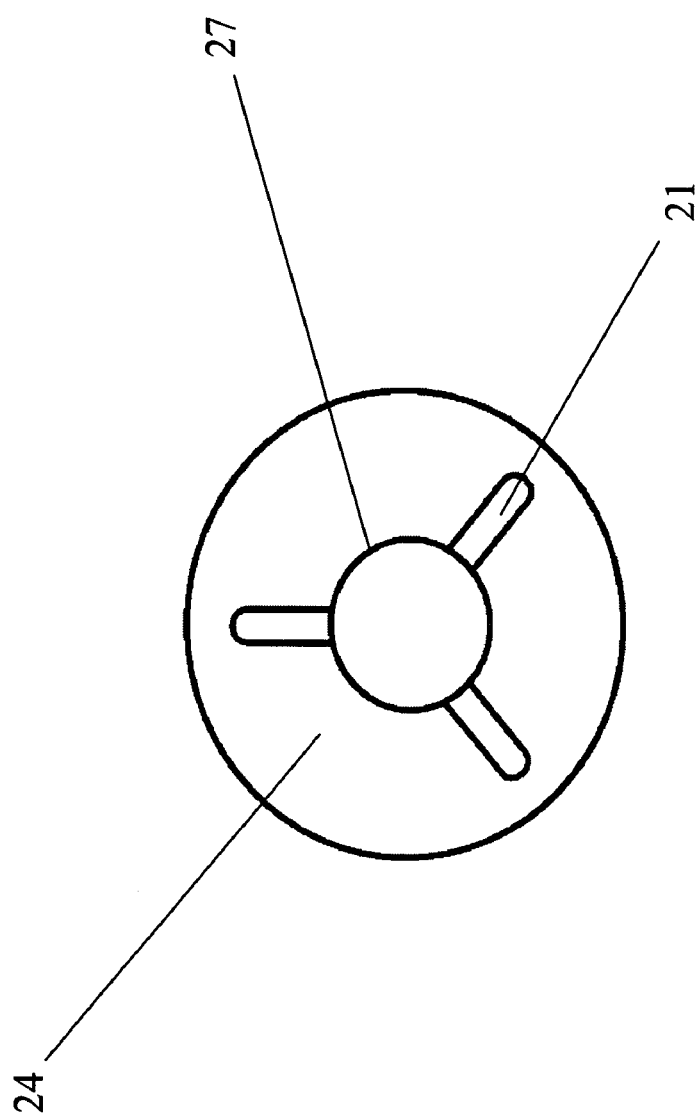
FIG. 3 shows a bottom view of the angled annular deflector looking along the path A-A.

In addition, the angled annular deflector (9) of the present invention is shown in cross-sectional form in FIG. 1. As can be seen, the angled annular deflector (9) is a conical shape being wider at the top and narrower at the bottom. The angled annular deflector (9) has a cavity (12) which is open at both ends (15 and 18). In FIG. 2 which is a top view and in FIG. 3 which is a bottom view of the angled annular deflector (9) it is seen that the angled annular deflector (9) has a planar cylindrical shape at the top and bottom. FIG. 3 further shows the supports (21) which support the angled annular deflector to the inside wall (24) of the inverted cone-shaped bottom portion (5).

Figure 4:
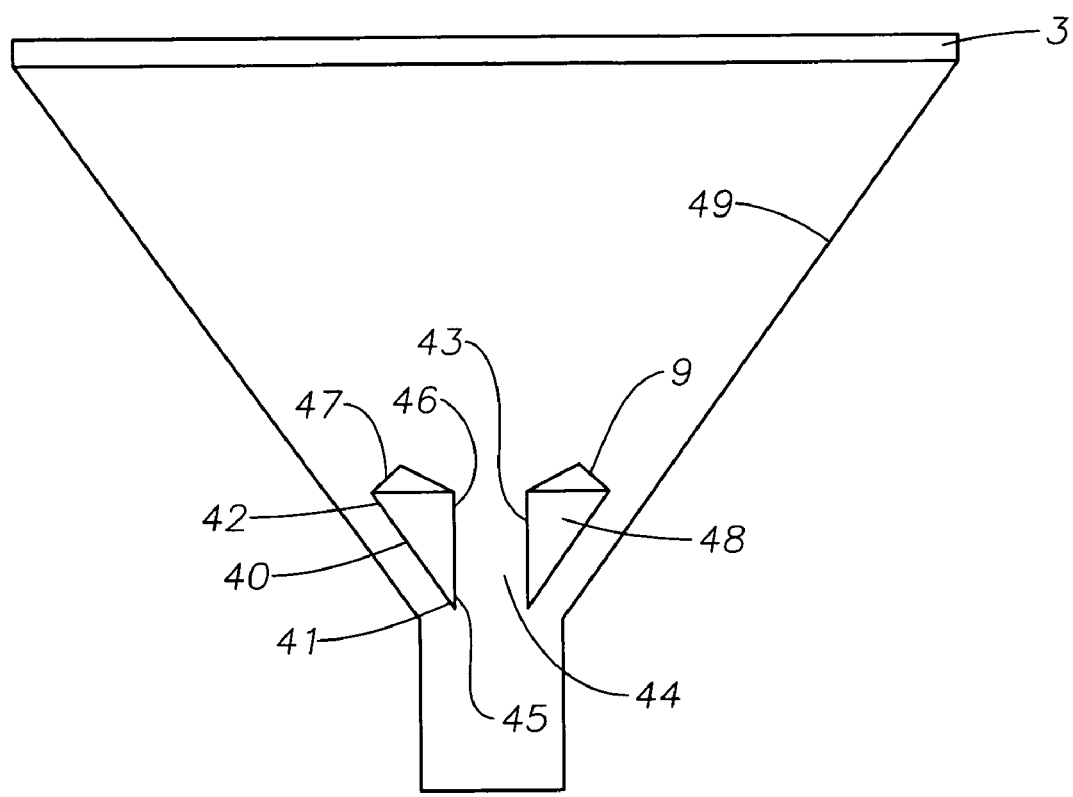
FIG. 4 shows a cut away view of the bottom head with an angular flow distribution angled annular deflector of the present invention.

Now referring to FIG. 4, the angled annular deflector 9 comprises: an outer surface 40 with a conical shape in the form of a frustum, the outer surface having an apex end 41 and a base end 42; a inner surface 43, forming an inner cavity 44 along a central axis, the cavity open at both ends, the inner surface having a first end 45 and a second end 46, and the first end 45 of the inner surface mated to the apex end 41 of the outer surface; and an upper surface 47 mated to the base end 42 of the outer surface and to the second end 46 of the inner surface; wherein the outer surface, the inner surface, and the upper surface form a substantially closed chamber 48, and wherein the outer surface 40 of the angled annular deflector 9 is in association with and is substantially parallel to an inner wall 49 of the cone-shaped bottom portion of the bottom head 3. In one embodiment, the inner surface 43 is substantially cylindrical.

The angled annular deflector (9) is further adapted to divide a stream of polymerizable fluid (30) flowing through said reactor into two or more streams (30, 33) flowing in at least two fluid flow paths of which at least one flow path (33) is directed upwardly between the inner wall (24) of the conical shaped bottom portion (5) and the outer surface (27) of the angled annular deflector (9) and at least one flow path (30) is directed generally through said angled annular deflector (9) upwardly along the central axis. The division of said stream being such that the velocity of fluid flowing (30) upwardly along the inner wall (24) of the reaction vessel is sufficient to entrain solid particles and liquid droplets and maintain the solid particles and liquid droplets in the fluid in an entrained state and to inhibit the buildup of solid particular polymer product on the inner wall (24) of the reaction vessel. And the velocity of the fluid flowing upwardly through the central axis (33) is sufficient to prevent solid particular polymer product from falling into said angled annular deflector (9) or inlet (6) and the combined overall velocity and direction of said fluid flowing in all flow paths being such that sufficient mixing is provided to ensure the general uniformity and distribution of the polymerizable fluids entering a fluidized bed region of the reactor.

Figure 5:
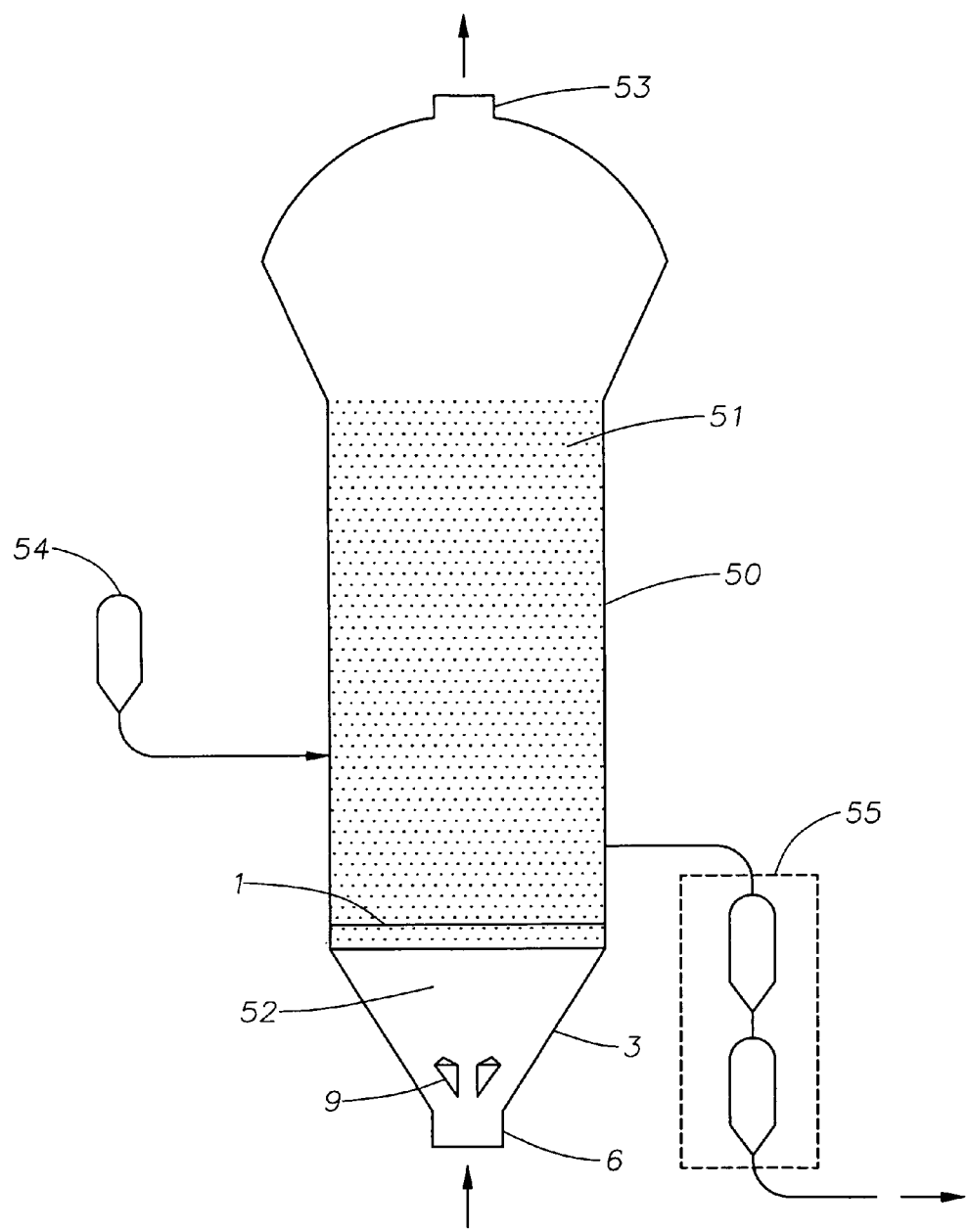
FIG. 5 shows a cut away view of a polymerization reactor with conical bottom head.

Now referring to FIG. 5, in one embodiment, the invention is an improvement to a fluidized bed polymerization reactor comprising: a generally cylindrical vessel 50 with a longitudinal axis; a distributor plate means 1 positioned in the vessel, generally perpendicular to the longitudinal axis of the vessel, the distributor plate means 1 defining a fluidized bed region 51 above the distributor plate means 1 and a mixing chamber region 52 below the distributor plate means 1; an inlet means 6 opening into the bottom portion of the vessel for continuously introducing a stream of polymerizable fluids into the mixing chamber at a gas velocity sufficient to maintain particles in the fluidized bed region in suspended and fluidized condition; an outlet means 53 for continuously removing unreacted polymerizable gases from the fluidized bed region; a catalyst injection means 54 for introducing polymerization catalyst into the fluidized bed region; a product removal means 55 for removing solid particulate polymer product from the fluidized bed region; and an cone shaped bottom head 3 attached to the generally cylindrical vessel 50. In this embodiment, the improvement comprises: a cone-shaped bottom head 3; and an angled annular deflector 9 as described above.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Angled Annular Deflector Simulation

Using FLUENT computational fluid dynamics software, four simulations were conducted. Three of the simulations used a prior art annular disk and varied the dimensions and one simulation used the angled annular deflector design of the present invention. The simulation model tracked 100 micron particles of liquid (isopentane) which is similar to that present in condensed mode operation of a fluidized bed polymerization reactor. The fate of the 100 micron particles (i.e., whether they escaped through the distributor plate or collided with a reactor wall) was determined. FLUENT was also used to determine the wall shear stress at a point along the wall approximately 2.3 ft. above the inlet.

The first simulation used a standard fluidized bed polymerization reactor vessel with a hemispherical bottom head with an annular disk. (See U.S. Pat. No. 4,933,149). Dimensions of this bottom head design are shown in Table 1.

TABLE 1

| Parameter | Simulation 1 |
| --- | --- |
| Inlet diameter | 29 in. |
| Diameter of angled annular deflector at widest region | 14.5 ft. |
| Vertical distance from inlet to distributor plate | 12.1 ft. |
| Inner annular disk diameter | 24 in. |
| Outer annular disk diameter | 54 in. |
| Minimum distance of annular disk to wall | 2.97 in. |

The second simulation used the same bottom head design as the first simulation but with a smaller outer diameter for the annular disk. Dimensions of this bottom head design are shown in Table 2.

TABLE 2

| Parameter | Simulation 1 |
| --- | --- |
| Inlet diameter | 29 in. |
| Diameter of angled annular deflector at widest region | 14.5 ft. |
| Vertical distance from inlet to distributor plate | 12.1 ft. |
| Inner annular disk diameter | 24 in. |
| Outer annular disk diameter | 51.6 in. |
| Minimum distance of annular disk to wall | 3.34 in. |

The third simulation used the same bottom head design as the first simulation but with a larger inner diameter for the annular disk. Dimensions of this bottom head design are shown in Table 3.

TABLE 3

| Parameter | Simulation 1 |
| --- | --- |
| Inlet diameter | 29 in. |
| Diameter of angled annular deflector at widest region | 14.5 ft. |
| Vertical distance from inlet to distributor plate | 12.1 ft. |
| Inner annular disk diameter | 26.4 in. |
| Outer annular disk diameter | 54 in. |
| Minimum distance of annular disk to wall | 2.97 in. |

The fourth simulation used the improvements of the present invention, i.e., a conical angled annular deflector and reactor vessel where the bottom portion of the bottom head is an inverted cone shape. Dimensions of this bottom head design are shown in Table 4.

TABLE 4

| Parameter | Simulation 4 |
| --- | --- |
| Inlet diameter | 29 in. |
| Diameter of angled annular deflector at widest region | 14.5 ft. |
| Vertical distance from inlet to distributor plate | 12.1 ft. |
| Inner annular disk diameter | 26.1 in. |
| Outer annular disk diameter | N/A |
| Minimum distance of annular disk to wall | 1.28 in. |

Example 2

Angled Annular Deflector Performance

Robust operation of a bottom head in condensed mode (where a significant portion of the recycle stream is condensate) requires that gases travel through the bottom head with sufficient momentum to carry a significant portion of liquid droplets into the fluidized bed. The fluidized bed, which is at a higher temperature than the bottom head, can vaporize the liquid. If liquid is not carried out of the bottom head, it will accumulate in a pool around the inlet, causing flow instabilities.

The ability to carry liquid out of the bottom head is reflected by the percentage of escaped particles. A larger escape percentage reflects more effective liquid transport into the fluidized bed, and therefore, the ability to operate at a higher level of condensate in the cycle gas.

Theoretically, an inlet without a flow deflector (either angular or an annular disk) will provide for the most efficient transport of liquid out of the bottom head, but this configuration (no flow deflector) is not adequate. When running in dry mode (no condensate in the cycle gas), a high-velocity gas flow along the bottom head wall is needed to keep the walls clear of resin that could agglomerate and plug distributor plate holes. The wall shear stress as used herein is the calculated gas shear stress at a point about 2 ft above the annular disk. A high shear stress will lead to improved wall scrubbing and less resin buildup on the bottom head wall.

The results of the four simulations are shown in Table 5. In Table 5,

TABLE 5

| Simulation | Percentage of Escaped Particles | Wall Shear Stress at 2.3 ft. above inlet (psi.) |
|---|---|---|
| 1 | 66 | 0.00069 |
| 2 | 65 | 0.00050 |
| 3 | 72 | 0.00041 |
| 4 | 81 | 0.0013 |

In practice, one would like to maximize both wall shear stress and escaped particle percentage to achieve good operation both during high levels of condensed mode operation and during dry-mode operation and transitions into and out of condensed mode. From Table 5, it is clear that with a hemispherical bottom head: (i) modifying the clearance between the wall and the outer edge of the annular disk seems to effect the wall shear without much impact on particle escape percentage (compare simulations 1 and 2); and (ii) modifying the configuration of the inner disk diameter (increased from simulation 1 to simulation 3) provides a minor increase in liquid escape percentage while greatly reducing wall shear stress.

One the other hand, it is clear in Table 5 that the conical bottom head of simulation 4 provides an entirely different solution to these problems. It has both an improved particle escape percentage and a higher wall shear stress. Thus, simulation 4 indicates that the present invention provides a superior design for maximizing these two phenomena.

Example 3

Advantages

As catalysts become more productive, it is advantageous to run higher production rates to get the most benefit out of a facility of limited size. With these higher rates come higher levels of condensing because of the greater cooling duty required for running at higher production rates. As condensate levels in the cool cycle gas increase, so does the potential to create flow instabilities at the bottom head inlet. These instabilities are caused by inefficient transfer of liquid out of the bottom head, such that the liquid forms a pool around the reactor inlet through which gas travels in discrete bubbles.

At high enough condensing levels, current technology comprising a hemispherical or elliptical bottom head and an annular disk will fail to prevent liquid pooling and consequent flow instabilities. The conical bottom head design with a parallel deflector of the present invention will prevent pooling at higher condensing levels, thus reactors can be run at higher production rates.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, methods and steps described in the specification. As one will readily appreciate from the disclosure, processes, machines, methods, or steps, presently existing or later to be developed that perform substantially the same function or achieve substantially the same result as the corresponding embodiments described herein may be utilized. Accordingly, the appended claims are intended to include within their scope such processes, machines, methods, or steps.

What is claimed is:

1. A fluidized bed polymerization reactor angular flow distribution device comprising:
   an angled annular deflector having:
      (a) an outer surface with a conical shape in the form of a frustum, said outer surface having an apex end and a base end;
      (b) an inner surface forming an inner cavity along a central axis, said inner cavity open at both ends, said inner surface having a first end and a second end, and said first end of said inner surface mated to said apex end of said outer surface; and
      (c) an upper surface mated to said base end of said outer surface and to said second end of said inner surface,
   wherein said outer surface, said inner surface, and said upper surface form a substantially closed chamber,
   wherein said angled annular deflector constructed to associate with a cone-shaped bottom portion of a fluidized bed polymerization reactor vessel and when in said association the outer surface of said angled annular deflector is at an angle to be substantially parallel to an inner wall of said cone-shaped bottom portion; and
   wherein said angled annular deflector further constructed to divide a stream of polymerizable fluid flowing through said reactor into two or more streams flowing in at least two fluid flow paths of which at least one flow path is directed upwardly between the outer surface of said angled annular deflector and the inner wall of said cone-shaped bottom portion and at least one flow path is directed generally through said angled annular deflector upwardly along the central axis, the division of said stream being such that the velocity of fluid flowing upwardly along said inner wall of said reaction vessel is sufficient to provide a wall shear stress of equal to or greater than about 0.0013 psi, and the velocity of fluid flowing upwardly through said inner cavity is sufficient provide a percentage of escaped particles of equal to or greater than about 81%.

2. The device of claim 1, wherein said inner surface is substantially cylindrical.

3. The device of claim 2, wherein a cross section of said angled annular deflector forms a pair of right triangles, wherein said outer surface is a hypotenuse of said right triangles.

4. The device of claim 2, said upper surface comprises two segments forming a sloped roof on said angled annular deflector.

5. The device of claim 1, wherein said upper surface comprises two segments forming a sloped roof on said angled annular deflector.

6. A fluidized bed polymerization reaction vessel bottom head device, comprising:
   (a) an inverted cone-shaped bottom portion attached to an inlet means for continuously introducing a stream of polymerizable fluids into said reactor; and
   (b) an angled annular deflector having:
      an outer surface wit a conical shape in the form of a frustum, said outer surface having an apex end and a base end;
      an inner surface forming an inner cavity along a central axis, said inner cavity open at both ends, said inner surface having a first end and a second end, and said first end of said inner surface mated to said apex end of said outer surface; and an upper surface mated to said base end of said outer surface and to said second end of said inner surface, wherein said outer surface, said inner surface, and said upper surface form a substantially closed chamber, and wherein the outer surface of said angled annular deflector is in association with and is substantially parallel to an inner wall of said inverted cone-shaped bottom portion, and said angled annular deflector being, adapted to divide said stream of polymerizable fluid flowing through said inlet means into two or more streams flowing in at least two fluid flow paths of which at least one flow path is directed upwardly between the outer surface of said angled annular deflector and the inner wall of said inverted cone-shaped bottom portion and at least one flow path is directed generally upwardly along the central axis of said angled annular deflector, the division of said stream being such that the velocity of fluid flowing upwardly along said inner wall of said reaction vessel is sufficient to provide a wall shear stress of equal to or greater than about 0.0013 psi, and the velocity of fluid flowing upwardly through said inner cavity is sufficient provide percentage of escaped particles of equal to or greater than about 81%.

7. A fluidized bed polymerization reactor having a generally cylindrical vessel with a longitudinal axis, a distributor plate means positioned in said generally cylindrical vessel, generally perpendicular to said longitudinal axis of said generally cylindrical vessel, said distributor plate means defining a fluidized bed region above said distributor plate means and a mixing chamber region below said distributor plate means; an inlet means opening into a bottom portion of said generally cylindrical vessel for continuously introducing a stream of polymerizable fluids into said mixing chamber at a gas velocity sufficient to maintain particles in said fluidized bed region in suspended and fluidized condition, and an outlet means for continuously removing unreacted polymerizable gases from said fluidized bed region, the improvement, comprising: a bottom head attached to said generally cylindrical vessel, wherein said bottom head has an inverted cone-shaped bottom portion; and an angled annular deflector having:

an outer surface with a conical shape in the form of a frustum, said outer surface having an apex end and a base end;

an inner surface forming an inner cavity along a ventral axis, said inner cavity open at both ends, said inner surface having a first end and a second end, and said first end of said inner surface mated to said apex end of said outer surface; and an upper surface mated to said base end of said outer surface and to said second end of said inner surface, wherein said outer surface, said inner surface, and said upper surface form a substantially closed chamber, and wherein the outer surface of said flow deflector is in association with and is substantially varallel to an inner wall of said inverted cone-shaped bottom portion of said bottom head, and wherein said angled annular deflector divides a stream of polymerizable fluid flowing through said reactor into two or more streams flowing in at least two fluid flow paths of which at least one flow path is directed upwardly between said outer surface of said angled annular deflector and said inner wall of said inverted cone-shaped bottom portion and at least one flow path is directed generally upwardly through said inner cavity along said central axis, the division of said stream being such that the velocity of fluid flowing upwardly along said inner wall of said reaction vessel is sufficient to provide a wall shear stress of equal to or greater than about 0.0013 psi, and the velocity of fluid flowing upwardly through said inner cavity is sufficient provide a percentage of escaped particles of equal to or greater than about 81%.

8. An improved method for delivery of a stream of polymerizable fluid to a gas-phase polymerization reaction, said method comprising the steps of:

(a) providing a bottom head attached to a generally cylindrical vessel, wherein said bottom head has an inverted cone-shaped bottom portion;

(b) providing an angled annular deflector comprising:

an outer surface with a conical shape in the form of a frustum, said outer surface having an apex end and a base end; and an inner surface forming an inner cavity along a central axis, said inner cavity open at both ends, wherein the outer surface of said flow deflector is in association with and is substantially parallel to an inner wall of said inverted cone-shaped bottom portion of said bottom head (c) dividing a stream of polymerizable fluid flowing into said reactor with said angled annular deflector, wherein said stream is divided into at least two streams flowing in at least two fluid flow paths of which at least one flow path is directed upwardly between said outer surface of said angled annular deflector and said inner wall of said inverted cone-shaped bottom portion of said bottom head and at least one flow path is directed generally through said angled annular deflector upwardly along said central axis, the division of said stream being such that a velocity of fluid flowing upwardly along said inner wall of said of said inverted cone-shaped bottom portion of said bottom head is sufficient to provide a wall shear stress of equal to or greater than about 0.0013 psi, and a velocity of fluid flowing upwardly through said angled annular deflector along said central axis is sufficient provide a percentage of escaped particles of equal to or greater than about 81%.

9. The method of claim 8, wherein: said inner surface has a first end and a second end; said first end of said inner surface is mated to said apex end of said outer surface; said angled annular deflector further comprises an upper surface mated to said base end of said outer surface and to said second end of said inner surface; and said outer surface, said inner surface, and said upper surface form a substantially closed chamber.

10. The method of claim 9, wherein said inner surface is substantially cylindrical.

* * * * *